(12) United States Patent
Chang et al.

(10) Patent No.: US 9,719,863 B1
(45) Date of Patent: Aug. 1, 2017

(54) THERMOMAGNETIC TEMPERATURE SENSING

(71) Applicant: HRL Laboratories, LLC, Malibu, CA (US)

(72) Inventors: Chia-Ming Chang, Agoura Hills, CA (US); John Wang, Los Angeles, CA (US); Geoffrey P McKnight, Los Angeles, CA (US); Ping Liu, San Diego, CA (US)

(73) Assignee: HRL Laboratories, LLC, Malibu, CA (US)

( * ) Notice: Subject to any disclaimer, the term of this patent is extended or adjusted under 35 U.S.C. 154(b) by 498 days.

(21) Appl. No.: 14/194,724

(22) Filed: Mar. 1, 2014

Related U.S. Application Data

(60) Provisional application No. 61/798,300, filed on Mar. 15, 2013.

(51) Int. Cl.
*G01K 7/36* (2006.01)
*G01R 31/36* (2006.01)

(52) U.S. Cl.
CPC ........... *G01K 7/36* (2013.01); *G01R 31/3627* (2013.01)

(58) Field of Classification Search
CPC .................................. G01K 7/36; G01R 33/00
USPC ......... 374/163, 176, 177, 16, 141, 152, 153, 374/184, 183
See application file for complete search history.

(56) References Cited

U.S. PATENT DOCUMENTS

| 1,697,148 | A |   | 1/1929 | Spooner |            |
|-----------|---|---|--------|---------|------------|
| 2,350,329 | A |   | 6/1944 | Homfeck |            |
| 2,480,433 | A | * | 8/1949 | Amsler  | G01D 5/2046 |
|           |   |   |        |         | 361/163    |
| 2,637,823 | A | * | 5/1953 | Anderson | G01K 7/38  |
|           |   |   |        |         | 310/25     |

(Continued)

FOREIGN PATENT DOCUMENTS

| JP | 61133828 A | * | 6/1986 |
|----|------------|---|--------|
| SU | 1113684 A  |   | 9/1984 |

(Continued)

OTHER PUBLICATIONS

Bozorth, R. M., "Ferromagnetism," D. Van Nostrand Company, 1951, pp. 720-723.

(Continued)

*Primary Examiner* — Gail Kaplan Verbitsky
(74) *Attorney, Agent, or Firm* — North Shore Associates

(57) ABSTRACT

A thermomagnetic sensor, measurement system and a method of measuring temperature employ a thermomagnetic probe to measure temperature of a device using a thermomagnetic effect. The thermomagnetic sensor includes a plurality of coils configured to provide a mutual inductance measurement between a selected pair of coils of the plurality and the thermomagnetic probe between the selected pair. The thermomagnetic probe includes a ferromagnetic material having a temperature-dependent magnetic permeability determined from the mutual inductance measurement. A predetermined relationship between the temperature-dependent magnetic permeability and temperature in a range between a maximum magnetic permeability value and a Curie temperature provides a measurement of a temperature local to the thermomagnetic probe.

20 Claims, 5 Drawing Sheets

(56) References Cited

U.S. PATENT DOCUMENTS

| | | | | |
|---|---|---|---|---|
| 2,756,595 | A | * | 7/1956 | Cluwen .................... G01K 7/38 236/88 |
| 3,164,993 | A | | 1/1965 | Schmidt |
| 3,413,540 | A | * | 11/1968 | Vansant .................... G01K 7/38 340/597 |
| 3,421,374 | A | | 1/1969 | Wieting et al. |
| 3,836,827 | A | * | 9/1974 | Cuthbertson ........ H01H 37/585 335/208 |
| 3,848,466 | A | * | 11/1974 | Dial ....................... G01K 13/02 324/224 |
| 3,950,993 | A | | 4/1976 | Sidor |
| 4,092,586 | A | | 5/1978 | Dinkler et al. |
| 4,256,945 | A | * | 3/1981 | Carter ....................... H05B 3/42 219/229 |
| 4,371,272 | A | * | 2/1983 | Iwasaki .................... G01K 7/38 336/45 |
| 5,062,062 | A | * | 10/1991 | Nishibe .................. G01D 3/022 702/41 |
| 5,087,804 | A | | 2/1992 | McGaffigan |
| 5,103,174 | A | * | 4/1992 | Wandass ................ B82Y 35/00 324/209 |
| 5,255,981 | A | * | 10/1993 | Schiessle ................. G01K 5/52 252/408.1 |
| 5,722,317 | A | | 3/1998 | Ghiron et al. |
| 5,766,793 | A | | 6/1998 | Kameishi et al. |
| 5,775,810 | A | | 7/1998 | Shin |
| 5,898,356 | A | | 4/1999 | Gascoyne et al. |
| 6,208,253 | B1 | | 3/2001 | Fletcher et al. |
| 6,210,824 | B1 | | 4/2001 | Sullivan et al. |
| 6,700,389 | B2 | | 3/2004 | Strayer et al. |
| 6,904,378 | B2 | | 6/2005 | Schilling et al. |
| 7,213,967 | B2 | | 5/2007 | Simunovic et al. |
| 7,537,384 | B2 | * | 5/2009 | Hilgers .................. G01K 7/003 374/176 |
| 7,595,128 | B2 | | 9/2009 | Lee et al. |
| 7,794,142 | B2 | | 9/2010 | Clothier et al. |
| 7,931,400 | B2 | | 4/2011 | Hasegawa et al. |
| 8,251,581 | B2 | | 8/2012 | Clothier et al. |
| 8,519,666 | B2 | | 8/2013 | Terao et al. |
| 9,417,292 | B1 | | 8/2016 | Chang et al. |
| 2003/0052696 | A1 | | 3/2003 | Strayer et al. |
| 2003/0081649 | A1 | * | 5/2003 | Strayer .................... G01K 7/00 374/142 |
| 2006/0023768 | A1 | * | 2/2006 | Ishihara .................. G01K 7/36 374/142 |
| 2006/0152313 | A1 | | 7/2006 | Zmood |
| 2008/0212646 | A1 | * | 9/2008 | Azuma .................. G01K 1/024 374/176 |
| 2009/0257470 | A1 | * | 10/2009 | Giors .................... F04D 19/042 374/163 |
| 2010/0006562 | A1 | | 1/2010 | Clothier |
| 2010/0080263 | A1 | | 4/2010 | Gonzales et al. |
| 2010/0276501 | A1 | | 11/2010 | Yoshimura et al. |
| 2010/0322283 | A1 | | 12/2010 | Clothier et al. |
| 2011/0090937 | A1 | | 4/2011 | Malyshev et al. |
| 2013/0315281 | A1 | * | 11/2013 | Malyshev ................ G01K 7/36 374/163 |

FOREIGN PATENT DOCUMENTS

| | | | |
|---|---|---|---|
| SU | 1134745 A | * | 1/1985 |
| WO | 2011106825 A2 | | 9/2011 |

OTHER PUBLICATIONS

Brito, V. L. O. et al., "Evaluation of a Ni—Zn Ferrite for Use in Temperature Sensors," Progress in Electromagnetics Research Letters, vol. 13, 2010, pp. 103-112.

Mavrudieva, D. et al., "Magnetic structures for contactless temperature sensor," Sensors and Actuators A, vol. 142 (2008), pp. 464-467.

Kim, Y. H. et al., "Remote Temperature Sensing System Using Reverberated Magnetic Flux," IEEE Transactions on Magnetics, vol. 36, No. 5, Sep. 2000, pp. 3643-3645.

Naoe, M et al., "Basic investigation of microtemperature sensor by means of a novel transmission-line technique using a temperature-sensitive Li—Zn—Cu ferrite substrate," Journal of Magnetism and Magnetic Materials,vol. 320 (2008), pp. e949-e953.

Weaver, J. B. et al., "Magnetic nanoparticle temperature estimation," Med. Phys., vol. 35, No. 5, May 2009, pp. 1822-1829.

* cited by examiner

THERMOMAGNETIC TEMPERATURE SENSING

CROSS-REFERENCE TO RELATED APPLICATIONS

This application claims priority from U. S. Provisional Patent Application, Ser. No. 61/798,300, filed Mar. 15, 2013, the entire contents of which is incorporated herein by reference.

STATEMENT REGARDING FEDERALLY SPONSORED RESEARCH OR DEVELOPMENT

N/A

BACKGROUND

1. Technical Field

The invention relates to systems and methods of measuring and testing. In particular, the invention relates to temperature sensors and measuring with temperature sensors.

2. Description of Related Art

Temperature is often an important system parameter to measure or monitor. In particular, temperature is often monitored to one or more of control an operational characteristic, improve efficiency and assure the safe operation of a device or system. For example, temperature may be measured to determine if a device is operating within a range that is deemed acceptable. If the temperature is determined to be either outside of the acceptable temperature range or exhibiting abnormal fluctuations, steps can be taken to adjust the temperature, for example by initiating either cooling or heating of the device. Alternatively, an operational characteristic of the device (e.g., power consumption) may be altered to maintain an acceptable operating temperature of the device. In other examples, system parameters of thermodynamic systems such as turbine engines or internal combustion engines can be optimized based on the real-time temperature information to achieve one or both of high efficiency and best performance. In yet other examples, temperature may be monitored to characterize an operational state or condition of the device or system. For example, a system may undergo an increase in temperature that, when a predetermined temperature is reached, indicates that the system has reached a goal state or condition. Monitoring or measuring the system temperature may be used to determine whether the goal has been achieved, and further may provide feedback to a controller that progress is being made by the system towards the goal.

Unfortunately, measuring temperature of a device or system may present certain challenges in many practical situations. For example, it may be useful to directly measure a temperature internal to a device instead of a surface temperature of the device. The internal temperature may be more meaningful than the surface temperature for various monitoring situations, for example. However, monitoring an internal temperature may present various practical difficulties, especially when it is difficult or even impossible to run wires into the device or system. For example, the device may be housed in a sealed container. Passing wires associated with a conventional temperature sensor (e.g., a thermal couple) through the container to measure the internal temperature may not be practical or even possible in certain situations. In other examples, such as temperature distribution mapping within a device, providing sensor leads to and from multiple temperature sensors at numerous points within the device may be impractical, may interfere with the mapping itself, and even may be detrimental to device operation. In yet other examples, a target of the temperature measurement may be a moving part or component of a system (e.g., a turbine blade rotating within a jet engine). Monitoring the temperature of such a moving target may not be practical using a wired temperature sensor, for example.

BRIEF SUMMARY

In some embodiments in accordance with the principles of the present invention, a thermomagnetic sensor is provided. The thermomagnetic sensor comprises a plurality of coils spaced apart from one another and configured to provide a mutual inductance measurement between a selected pair of the coils of the plurality. The thermomagnetic sensor further comprises a thermomagnetic probe between the selected pair of coils, the thermomagnetic probe comprising a ferromagnetic material having a temperature-dependent magnetic permeability characterized by a maximum value at a temperature below a Curie temperature of the ferromagnetic material. The temperature-dependent magnetic permeability of the ferromagnetic material monotonically decreases as a function of temperature between a temperature corresponding to the maximum value and the Curie temperature. The mutual inductance measurement is configured to provide a measurement of temperature local to the thermomagnetic probe according to a predetermined relationship between the temperature-dependent magnetic permeability and temperature.

In some embodiments in accordance with the principles of the present invention, a battery-temperature measurement system is provided. The battery-temperature measurement system comprises a thermomagnetic probe in a battery. The thermomagnetic probe comprises a ferromagnetic material having a temperature-dependent magnetic permeability that decreases monotonically as a function of temperature between a maximum value at a temperature below a Curie temperature of the ferromagnetic material and the Curie temperature. The battery-temperature measurement system further comprises a plurality of magnetic field coils external to the battery and a temperature measurement apparatus to determine a temperature of the battery. The temperature of the battery is determined according to a predetermined relationship between the temperature-dependent magnetic permeability and temperature using a mutual inductance measurement between selected magnetic field coils of the plurality to measure the temperature-dependent magnetic permeability. Further, the determined temperature is between a temperature corresponding to the maximum value and the Curie temperature.

In some embodiments in accordance with the principles of the present invention, a method of measuring temperature using a thermomagnetic effect is provided. The method of measuring temperature comprises locating a thermomagnetic probe adjacent to a plurality of coils. The thermomagnetic probe comprises a ferromagnetic material having a temperature-dependent magnetic permeability characterized by a maximum value at a temperature below a Curie temperature of the ferromagnetic material. The temperature-dependent magnetic permeability monotonically decreases between the temperature corresponding to the maximum value and the Curie temperature. The method of measuring temperature further comprises measuring a mutual inductance between a pair of the coils of the plurality to determine the temperature-dependent magnetic permeability of the thermomagnetic probe. The method of measuring temperature further comprises determining a temperature local to the thermomagnetic probe according to a predetermined relationship between the temperature-dependent magnetic permeability and temperature. The local temperature is determined in a temperature range between the temperature corresponding to the maximum value and the Curie temperature.

BRIEF DESCRIPTION OF THE DRAWINGS

Various features of embodiments in accordance with the principles of the present invention described herein may be more readily understood with reference to the following detailed description taken in conjunction with the accompanying drawings, where like reference numerals designate like structural elements, and in which.

Certain embodiments according to the principles of the present invention have other features that are one of in addition to and in lieu of the features illustrated in the above-referenced figures. These and other features are detailed below with reference to the above-referenced figures.

DETAILED DESCRIPTION

Embodiments consistent with the principles of the present invention as described herein provide remote determination or measurement of a temperature of a device or structure. In particular, the temperature of a device or structure may be determined by an effect that the temperature has on a magnetic property of a thermomagnetic probe located within the device or structure as measured by a mutual inductance measurement. Further, the temperature is measured remotely using the mutual inductance measurement and without direct contact (e.g., electrical contact, physical contact, etc.) with the thermomagnetic probe, according to various embodiments. The remote sensing of temperature according to the principles of the present invention may facilitate measuring temperature internal to the device or structure where it may be difficult or substantially impossible to run wires to perform the measurement using conventional (e.g., wired) temperature sensors, for example. In addition, low frequency magnetic sensing according to embodiments of the present invention may also enable high penetration detection to obtain the internal temperature information of the device or structure. Moreover, the remote temperature sensing described herein also provides two-dimensional (2-D), and in some examples, three-dimensional (3-D), mapping of temperature within the device or structure, according to various embodiments.

Figure 1:
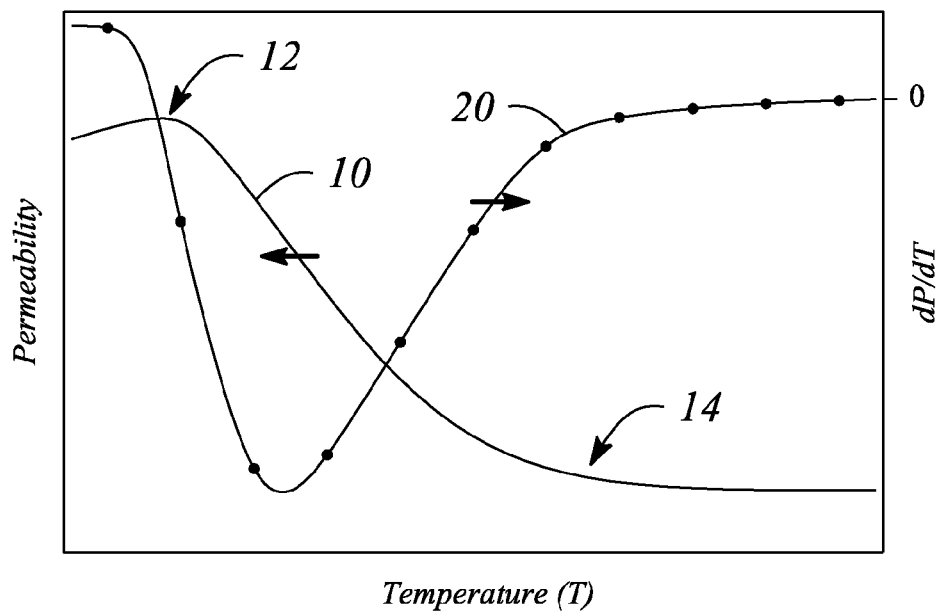
FIG. 1 illustrates a graph of a magnetic property of an example ferromagnetic material as a function of temperature, according to an embodiment consistent with the principles of the present invention.

FIG. 1 illustrates a graph of a magnetic property of an example ferromagnetic material as a function of temperature, according to an embodiment consistent with the principles of the present invention. The variation of the magnetic property of the ferromagnetic material as a function of temperature is often referred to as a 'thermomagnetic effect.' In particular, FIG. 1 illustrates a temperature-dependent variation in magnetic permeability 10 as a function of temperature that is characteristic of ferromagnetic materials used in the thermomagnetic probe, according to various examples. The temperature-dependent magnetic permeability 10 of the ferromagnetic material exhibits a maximum or peak value, known as the Hopkinson peak 12, and a Curie point or Curie temperature 14. The Curie temperature 14 is a temperature at which the example ferromagnetic material undergoes a transition and becomes substantially paramagnetic, by definition herein. As illustrated, the temperature-dependent magnetic permeability 10 decreases monotonically from the maximum value at the Hopkinson peak 12 to an effective paramagnetic magnetic permeability at the Curie temperature 14 with increasing temperature. In some examples (e.g., as illustrated), the temperature-dependent magnetic permeability 10 may increase (e.g., have a positive slope) as a function of increasing temperature below the temperature of the Hopkinson peak 12.

Further, a substantially similar or even identical thermomagnetic curve (i.e., change in the temperature dependent magnetic permeability 10) may be followed as a function of both increasing and decreasing temperature, according to various examples. In particular, the temperature-dependent variation in magnetic permeability 10 may undergo substantially the same thermomagnetic transition during heating cycles and during cooling cycles, for example. As such, the temperature-dependent magnetic permeability 10 illustrated in FIG. 1 may be substantially independent of a direction (i.e., increase or decrease) in which temperature changes.

FIG. 1 also illustrates a curve representing a first derivative 20 of magnetic permeability with respect to temperature. The magnetic permeability derivative 20 typically includes a maximum value at a temperature below the temperature of the Hopkinson peak 12 and a minimum value between the temperature of the Hopkinson peak 12 and the Curie temperature 14 of the ferromagnetic material. In some examples, the maximum value of the magnetic permeability derivative 20 may be slightly positive due to the positive slope of the temperature-dependent magnetic permeability 10 at a temperature below the temperature of the Hopkinson peak 12. The magnetic permeability derivative 20 typically becomes substantially zero at temperatures above the Curie temperature 14, as illustrated in FIG. 1.

As used herein, the article 'a' is intended to have its ordinary meaning in the patent arts, namely 'one or more'. For example, 'a coil' means one or more coils and as such, 'the coil' means 'the coil(s)' herein. Also, any reference herein to 'top', 'bottom', 'upper', 'lower', 'up', 'down', 'front', back', 'left' or 'right' is not intended to be a limitation herein. Herein, the term 'about' when applied to a value generally means within the tolerance range of the equipment used to produce the value, or in some examples, means plus or minus 20%, or plus or minus 10%, or plus or minus 5%, or plus or minus 1%, unless otherwise expressly specified. Further, herein the term 'substantially' as used herein means a majority, or almost all, or all, or an amount with a range of about 51% to about 100%, for example. Moreover, examples herein are intended to be illustrative only and are presented for discussion purposes and not by way of limitation.

Figure 2A:
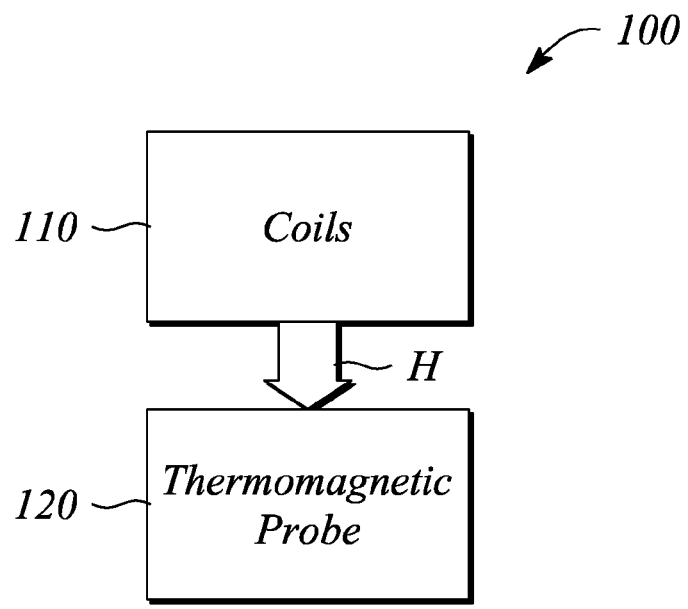
FIG. 2A illustrates a block diagram of a thermomagnetic sensor, according to an embodiment consistent with the principles of the present invention.
Figure 2B:
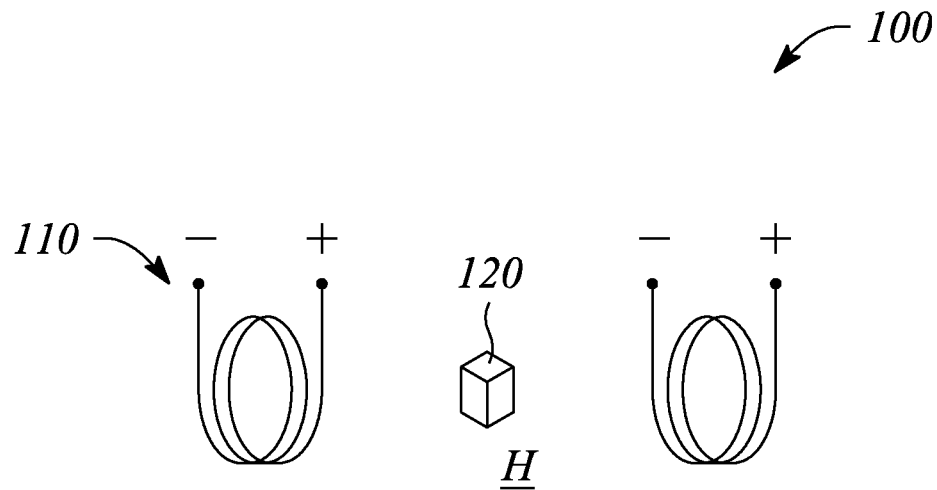
FIG. 2B illustrates a schematic view of an example thermomagnetic sensor, according to an embodiment consistent with the principles of the present invention.

FIG. 2A illustrates a block diagram of a thermomagnetic sensor 100, according to an embodiment consistent with the principles of the present invention. FIG. 2B illustrates a schematic view of an example thermomagnetic sensor 100, according to an embodiment consistent with the principles of the present invention. The thermomagnetic sensor 100 employs a thermomagnetic effect to measure or determine temperature. The measured or determined temperature is a temperature of the thermomagnetic sensor 100 or equivalently of an environment or vicinity local to the thermomagnetic sensor 100 (e.g., an internal temperature of a device comprising the thermomagnetic sensor 100). According to some embodiments, the measured temperature is within a predefined range of temperature values. However, while specific examples of the thermomagnetic sensor 100 may exhibit a predefined range of temperatures that may be measured, the predefined range of temperature values may be adjusted or tailored to facilitate measurement of a wide variety of temperature ranges, according to various embodiments.

The thermomagnetic sensor illustrated in FIGS. 2A and 2B comprises a plurality of coils 110 (e.g., two coils are illustrated in FIG. 2B) and a thermomagnetic probe 120. The coils 110 of the plurality are spaced apart from one another and are configured to provide a mutual inductance measurement between a pair of the coils 110. In particular, one or more mutual inductance measurements between pairs of coils 110 of the plurality may be provided using the configuration of coils 110. For example, a different mutual inductance measurement may be provided or performed for each different pairwise combination of coils 110 of the plurality. In some embodiments, a coil 110 of the plurality may comprise between about ten and about forty (e.g., about thirty-three) turns or loops of wire. The turns or loops of wire may be wound around a cylindrical form (e.g., a cylinder or tube of dielectric material, etc.), for example.

According to various embodiments, the coils 110 (e.g., a selected pair of coils 110) provide an alternating magnetic field that is used in providing the mutual inductance measurement. As such, one or more of the coils 110 of the plurality may be or serve as an alternating magnetic field source configured to produce an alternating (e.g., sinusoidal wave, square wave, etc.) magnetic field H. For example, an alternating current (AC) current flowing in a coil 110 of the pair of coils 110 produces an alternating magnetic field H around and between the pair of coils 110. The alternating magnetic field H may facilitate measurement of the mutual inductance between the pair of coils 110.

In various embodiments, the alternating magnetic field H or equivalently an AC current used to produce the alternating magnetic field H has a predetermined maximum frequency and a predetermined minimum frequency. The predetermined maximum frequency of the alternating magnetic field H may be established by a limited ability of the alternating magnetic field H to penetrate to an object, device or structure being measured using the thermomagnetic sensor 100. In particular, in some embodiments, the alternating magnetic field H may have a predetermined maximum frequency of less than about 10 kilohertz (kHz). In some examples, the predetermined maximum frequency may be less than about 1 kHz. In some examples, the predetermined maximum frequency is less than about 500 hertz (Hz). In some examples, the alternating magnetic field H has a predetermined minimum frequency that is greater than about 10 Hz and a predetermined maximum frequency that is less than about 10 kilohertz. For example, the frequency of the alternating magnetic field H may be between about 100 Hz (e.g., the predetermined minimum frequency) and 200 Hz (e.g., the predetermined maximum frequency). In another example, the frequency may be between about 110 Hz and 750 Hz. In another example, the frequency may be about 120-130 Hz.

In some embodiments, the alternating magnetic field H is produced by connecting one or both of an AC current source (not illustrated) and an AC voltage source (not illustrated) to one or both of the coils 110 of the pair. In some embodiments, the mutual inductance measurement is provided by the coils 110 using one of an inductance meter and an impedance meter that includes the AC source (e.g., one or both of the AC voltage and current sources). For example, the inductance meter may be an inductance-capacitance-impedance (LCZ) meter such as, but not limited to, a Keithley 3330 LCZ meter manufactured by Keithley Instruments, Inc., of Cleveland, Ohio. The LCZ meter generally includes the AC source that can be used to produce the alternating magnetic field H with the pair of coils 110.

As illustrated in FIGS. 2A and 2B, the thermomagnetic sensor 100 further comprises the thermomagnetic probe 120. As illustrated in FIG. 2B, by way of example and not limitation, the thermomagnetic probe 120 is located between a pair of coils 110 (i.e., the selected pair). According to various examples, the thermomagnetic probe 120 comprises a ferromagnetic material having a temperature-dependent magnetic property (e.g., temperature-dependent magnetic permeability). The temperature-dependent magnetic property, and specifically the temperature-dependent magnetic permeability, affects the mutual inductance measurement between the selected pair of coils 110 to provide a measurement of temperature local to the thermomagnetic probe 120, according to various embodiments. In particular, temperature-dependent magnetic permeability of the thermomagnetic probe 120 may modify a coupling (e.g., using the alternating magnetic field H) between the selected pair of coils 110. The modification of the coupling facilitates measurement of the mutual inductance and, by extension, the temperature-dependent magnetic permeability of the thermomagnetic probe 120. In turn, the temperature-dependent magnetic permeability is used to determine the temperature of the thermomagnetic probe 120 and therefore, the environment or local vicinity of the thermomagnetic probe 120.

In some examples, the selected pair of coils 110 is located on substantially opposite sides of the thermomagnetic probe 120 (e.g., as illustrated in FIG. 2B). In other examples, the coils 110 of the selected pair may not be on opposite sides of the thermomagnetic probe 120, but may still provide a mutual inductance measurement that includes an effect of temperature on the thermomagnetic probe 120. For example (not illustrated), the pair of coils may be collocated with one another as a bifilar coil. In a similar example (not illustrated), the selected pair of coils 110 may be located adjacent to one another and on only one side of the thermomagnetic probe 120. In any example, as long as at least a portion of the alternating magnetic field H used in the mutual inductance measurement passes through or intercepts the thermomagnetic probe 120 to affect the coupling between the selected pair of coils 110, the mutual inductance measurement may yield data used to determine temperature of the thermomagnetic probe 120, according to various embodiments.

According to various embodiments, the ferromagnetic material of the thermomagnetic probe 120 may be substantially any ferromagnetic material having a temperature-dependent magnetic permeability characterized by a maximum value of the magnetic permeability (i.e., the Hopkinson peak) at a temperature below the Curie point or temperature of the ferromagnetic material. Further, the ferromagnetic material of the thermomagnetic probe 120 has or exhibits a monotonically decreasing magnetic permeability as a function of temperature between the temperature corresponding to the maximum magnetic permeability value and the Curie temperature. The monotonically decreasing magnetic permeability as a function of temperature is defined and referred to herein as a 'monotonic temperature-dependent magnetic permeability transition' for that reason.

According to some embodiments, a thermomagnetic transition of the temperature-dependent magnetic permeability of the ferromagnetic material between the maximum magnetic permeability and the Curie temperature value is substantially similar (e.g., exhibits little or no hysteresis) regardless of whether the thermomagnetic probe 120 is being heated or cooled. That is, the thermomagnetic transition is substantially the same in a heating cycle as in a cooling cycle, according to some embodiments. In particular, the monotonic temperature-dependent magnetic permeability transition or change is substantially similar (e.g., follows a substantially similar path) regardless of whether the ferromagnetic material is subjected to a generally increasing or a generally decreasing temperature. Further, the ferromagnetic material of the thermomagnetic probe 120 explicitly includes both ferromagnetic materials in which substantially all constituent magnetic domains add a positive contribution to a net magnetization as well as materials often referred to as 'ferrimagnetic' materials in which some of the magnetic domains may be anti-aligned, by definition herein.

In some embodiments, the ferromagnetic material of the thermomagnetic probe 120 comprises nickel (e.g., as a 'pure' metal, an alloy, a compound or a mixture). For example, the ferromagnetic material may be a nickel alloy that comprises nickel (Ni) and one or more of iron (Fe), copper (Cu), aluminum (Al), chromium (Cr), gold (Au), palladium (Pd), zinc (Zn) and silicon (Si). A Ni—Cu alloy having about 70% Ni and 30% Cu may be employed as the ferromagnetic material of the thermomagnetic probe 120, for example. Other ferromagnetic materials that may be employed include, but are not limited to, alloys, compounds or mixtures comprising one or more of cobalt (Co), Fe, gadolinium (Gd) and dsyprosium (Dy), as well as manganese (Mn) and chromium (Cr), which may produce ferromagnetic crystals in combination with other atoms such as bismuth (Bi), arsenic (As) and antimony (Sb) (e.g., MnBi, MnAs, MnSb). Various oxides and compounds including oxygen (O) that exhibit ferromagnetic characteristics including, but not limited to, $Fe_2O_3$, $FeOFe_2O_3$, $NiOFe_2O_3$, $CuOFe_2O_3$, etc., also may be employed as the ferromagnetic material of the thermomagnetic probe 120. Even if not explicitly listed herein, substantially any material that exhibits a temperature-dependent magnetic permeability having both of the Hopkinson peak and the Curie temperature, as well as the monotonic decrease in the temperature-dependent magnetic permeability between the Hopkinson peak and the Curie temperature as a function of increasing temperature (i.e., the Hopkinson peak is below the Curie temperature), may be used to realize the thermomagnetic probe 120, according to various embodiments.

Figure 3:
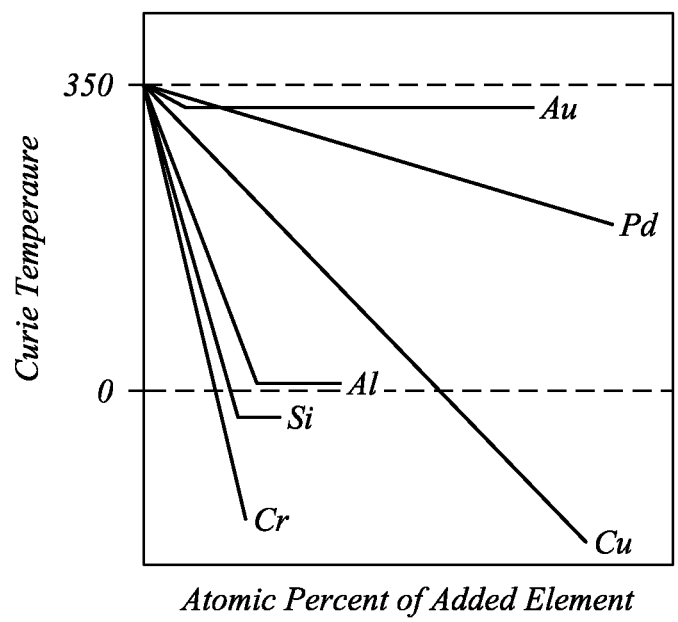
FIG. 3 illustrates a graph depicting a Curie temperature adjustment, according to an embodiment consistent with the principles of the present invention.

According to some embodiments of the present invention, one or both of the Curie temperature and a slope of the temperature-dependent magnetic permeability may be adjusted or tailored to a specific application of the thermomagnetic sensor 100. For example, the Curie temperature of various example nickel alloys may be adjusted by changing a relative percentage composition of Ni and another constituent of the alloy. FIG. 3 illustrates a graph depicting a Curie temperature adjustment, according to an embodiment consistent with the principles of the present invention. In particular, FIG. 3 illustrates a variation of the Curie temperature for various nickel alloys as a function of atomic percent of elements added to the nickel. FIG. 3 is based on FIG. 14-11, page 721 of Bozorth, R., *Ferromagnetism*, D. Van Nostrand Company, 1951, incorporated herein by reference. In another example, fabrication conditions such as, but not limited to, sintering temperature instead of or in addition to composition may be used to control or adjust one or both of the Curie temperature and the temperature-dependent magnetic permeability slope. See for example, Brito et al., "Evaluation of a Ni—Zn Ferrite for use in Temperature Sensors," Progress in Electromagnetic Research Letters, Vol. 13, 2010, pp. 103-112, incorporated herein by reference.

According to various embodiments, the ferromagnetic material may be formed into or provided in substantially any shape or configuration as may be suitable for realizing the thermomagnetic probe 120 for a particular application. For example, the ferromagnetic material may be formed into or provided as a rod or wire shape. The rod or wire shape may facilitate insertion into a device for which temperature is to be measured using the thermomagnetic sensor 100, for example. In another example, the thermomagnetic probe 120 may be formed into a spheroidal shape or an ellipsoidal shape (e.g., a sphere, an egg-shape, etc.). In yet another example, the ferromagnetic material of the thermomagnetic probe 120 may be deposited as a layer or a film on a substrate. The layer may be a thin film on a surface of another, non-ferromagnetic metal, for example. The thermomagnetic probe 120 may even be realized as a plurality of particles (e.g., microparticles or nanoparticles). The particle form of the thermomagnetic probe 120 may facilitate monitoring or measuring temperature in a local region over which the particles are distributed, for example.

As mentioned above, the thermomagnetic probe 120 between the selected pair of coils 110 interacts with the alternating magnetic field H provided by the selected coils 110 (e.g., through a coupling between the coils 110) during the mutual inductance measurement. As a result, the mutual inductance measured for the selected coils 110 is altered by the presence of the thermomagnetic probe 120 in a manner that corresponds to the temperature-dependent magnetic permeability. In particular, using calibration, a predetermined relationship between the temperature-dependent magnetic permeability and temperature may be determined for a particular relationship (e.g., relative location, etc.) of the thermomagnetic probe 120 and the selected coils 110. From the predetermined relationship, a measurement of temperature local to the thermomagnetic probe 120 may be provided by the mutual inductance measurement, according to various embodiments.

In some embodiments, the predetermined relationship is described or defined in a range between the maximum value (Hopkinson peak) and the Curie temperature of the ferromagnetic material. The predetermined relationship may be provided by a calibration curve for the thermomagnetic sensor 100, for example. The calibration curve may be provided or determined by subjecting the thermomagnetic probe 120 to a plurality of temperatures and determining one or both of the magnetic permeability and a change in the magnetic permeability as a function of temperature using mutual inductance measurements between the selected coils 120, for example. As such, the calibration curve may define the predetermined relationship in terms of one or both of the temperature-dependent magnetic permeability itself and a temperature derivative of the magnetic permeability.

In some embodiments, the plurality of coils 110 are arranged to substantially surround and enclose the thermomagnetic probe 120. For example, the plurality of coils 110 may be arranged in a ring or similar two-dimensional (2-D) shape around the thermomagnetic probe 120. When arranged in a ring, an angular spacing between the coils 110 around the ring may be substantially equiangular, in some examples. In other examples, the coils 110 may be arranged around the thermomagnetic probe 120 according to another configuration including, but not limited to, along a periphery of a polygonal boundary (e.g., a rectangular boundary, a pentagonal boundary, etc.). In yet other examples, the coils 110 may be arranged on a substantially three-dimensional (3-D) surface (e.g., a spheroidal surface, a 3-D rectilinear surface, etc.) that encloses the thermomagnetic probe 120.

Figure 4:
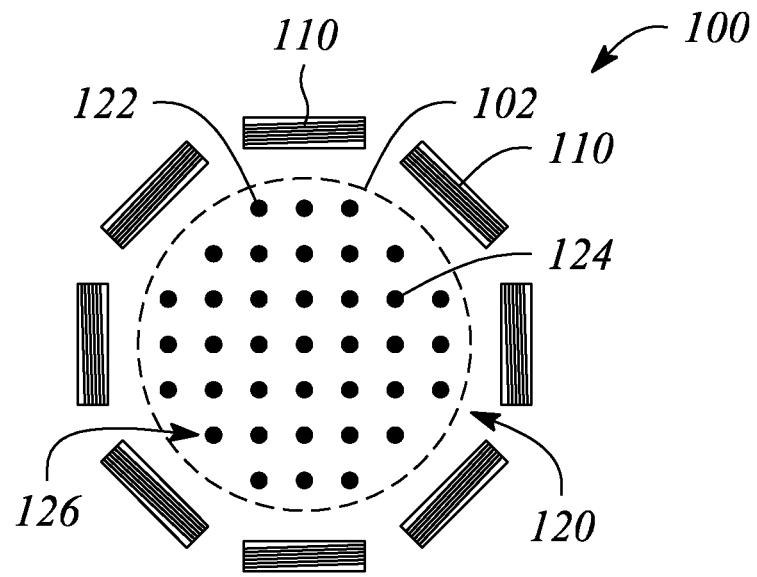
FIG. 4 illustrates a top view of a thermomagnetic sensor, according to an embodiment consistent with the principles of the present invention.

FIG. 4 illustrates a top view of a thermomagnetic sensor 100, according to an embodiment consistent with the principles of the present invention. In particular, FIG. 4 illustrates the thermomagnetic sensor 100 with a plurality of coils 110 arranged to surround and enclose a thermomagnetic probe 120. As illustrated, by way of example and not limitation, the plurality of coils 110 includes eight (8) coils 110. The eight coils 110 are arranged in a ring around a thermomagnetic probe 120. Further, the eight coils 110 are spaced around the ring with an equiangular spacing of about 45 degrees, as illustrated in FIG. 4. The thermomagnetic probe 120 may be located inside a device 102 (e.g., a battery), which is to be monitored by the thermomagnetic sensor 100. The device 102 is represented by a dashed line in FIG. 4 and may or may not correspond to a physical structure. For example, the dashed line may correspond to a casing or housing of the device 102. In another example, the device 102 may have another shape other than that illustrated by the dashed line such that the dashed line does not represent the physical structure of the device 102, but instead merely represents an arbitrary boundary associated with the device 102.

Figure 5A:
FIG. 5A illustrates a schematic view of a thermomagnetic sensor having a mobile thermomagnetic probe, according to an embodiment consistent with the principles of the present invention.

In some embodiments, one or more of the coils 110 of the plurality are stationary and the thermomagnetic probe 120 is configured to be mobile with respect to the stationary coil(s) 110. By 'stationary' it is meant that the stationary coil(s) are fixed with respect to a local frame of reference, while by 'mobile' it is meant that the thermomagnetic probe 120 is configured to move relative to the local reference frame. For example, the selected pair of coils 110 may be stationary and the thermomagnetic probe 120 may be configured to move with respect to the stationary selected coils 110. FIG. 5A illustrates a schematic view of a thermomagnetic sensor 100 having a mobile thermomagnetic probe 120, according to an embodiment consistent with the principles of the present invention. Motion of the thermomagnetic probe 120 is illustrated by a heavy arrow in FIG. 5A.

In some embodiments, the thermomagnetic sensor 100 further comprises a rotating member such as, but not limited to, a wheel (e.g., a turbine wheel, a gear, an armature/rotor etc.) and a rotating shaft (e.g., drive axle). The mobile thermomagnetic probe 120 may be located on and be configured to move with the rotating member, while the stationary coil(s) 110 may be arranged around the rotating member, according to various embodiments. As the rotating member rotates, the thermomagnetic probe 120 may move or rotate between the selected pair of the stationary plurality of coils 110.

Figure 5B:
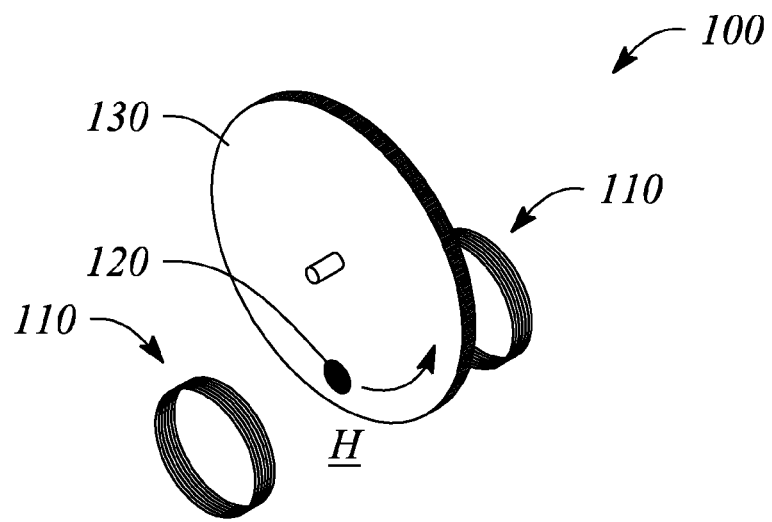
FIG. 5B illustrates a perspective view of a thermomagnetic sensor having a rotating member, according to an embodiment consistent with the principles of the present invention.

FIG. 5B illustrates perspective view of a thermomagnetic sensor 100 having a rotating member 130, according to example consistent with the principles of the present invention. The rotating member 130 may be a disk or wheel mounted to rotate on about an axle, for example. As illustrated, the thermomagnetic probe 120 is located on the rotating member 130, while coils of a selected pair of the stationary coils 110 of the plurality are located on either side of the rotating member 130. As the rotating member 130 rotates, the thermomagnetic probe 120 passes between the stationary coils 110. A mutual inductance measurement taken at a predetermined point in the rotation of the rotating member 130 may be used to determine a temperature local to the thermomagnetic probe 120, according to various embodiments. The predetermined point may be a point of closest approach between the thermomagnetic probe 120 and a coil 110 of the pair of stationary coils 110, for example.

In some embodiments of the present invention, the thermomagnetic sensor 100 is configured to provide a thermal image of a device in which temperature is being measured. In particular, the thermomagnetic sensor 100 may provide either a 2-D thermal image or a 3-D thermal image of the device, according to various examples. According to various embodiments, the coils 110 of the plurality may be spaced apart from one another and distributed one or both of along an axial length of and substantially non-coplanar with respect to the device. The thermomagnetic probe 120 may be located either adjacent to (e.g., in front of) or between pairs (e.g., selected pairs) of coils 110 of the plurality. The thermal image may be constructed from a plurality of mutual inductance measurements to determine the temperature-dependent magnetic permeability of the thermomagnetic probe 120, according to some embodiments.

In particular, as further illustrated in FIG. 4, the thermomagnetic probe 120 may comprise a plurality of separate, spaced-apart sub-probes or equivalently a plurality of thermomagnetic probes 120. For example, the thermomagnetic probe 120 may include a first sub-probe 122 spaced apart from a second sub-probe 124, a second sub-probe 124 spaced apart from a third sub-probe 126, and so on. Further, as illustrated in FIG. 4, the sub-probes of the thermomagnetic probe 120 may be spaced apart on a grid, for example. Each sub-probe 122, 124, 126 of the plurality of separate, spaced-apart sub-probes may exhibit a temperature-dependent magnetic permeability associated with a local temperature in a vicinity of the sub-probe 122, 124, 126. The sub-probes may be distributed within a device (e.g., a battery or battery system), for example. According to some examples, each of the sub-probes 122, 124, 126 may be substantially similar to one another in terms of performance and differ only in location.

A plurality of different mutual inductance measurements configured to determine the temperature-dependent magnetic permeability of the various sub-probes may be combined to produce a multi-dimensional (2-D or 3-D) thermal image of a temperature within a device, according to some embodiments. For example, the plurality of coils 110 may be positioned and configured to provide the plurality of different mutual inductance measurements. Using the plurality of different mutual inductance measurements, the temperature-dependent magnetic permeability of different ones of the various sub-probes may be determined. Temperatures local to the various sub-probes are then determined from the determined temperature-dependent magnetic permeability values using a predetermined or calibrated relationship between temperature and the temperature-dependent magnetic permeability for the various sub-probes. With information regarding a location of the various sub-probes, the local temperature of the sub-probes may then be combined to provide a multi-dimensional (2-D or 3-D) thermal image or temperature profile associated with an environment of the sub-probes. For example, if the sub-probes that make up the thermomagnetic probe 120 are located within a device, a multi-dimensional (2-D or 3-D) thermal image of the device may be constructed.

According to some embodiments of the present invention, a temperature measurement system is provided. For example, the temperature measurement system may measure the temperature of a device such as, but not limited to, a battery, an internal combustion engine, an electric motor, and a turbine engine. Internal temperature information provided by the temperature measurement system may be used to ensure safe operating conditions as well as to achieve high efficiency and performance of the device or system, for example. Hereinafter, the temperature measurement system will be described in terms of a battery-temperature measurement system, for simplicity of discussion and without limitation.

Figure 6:
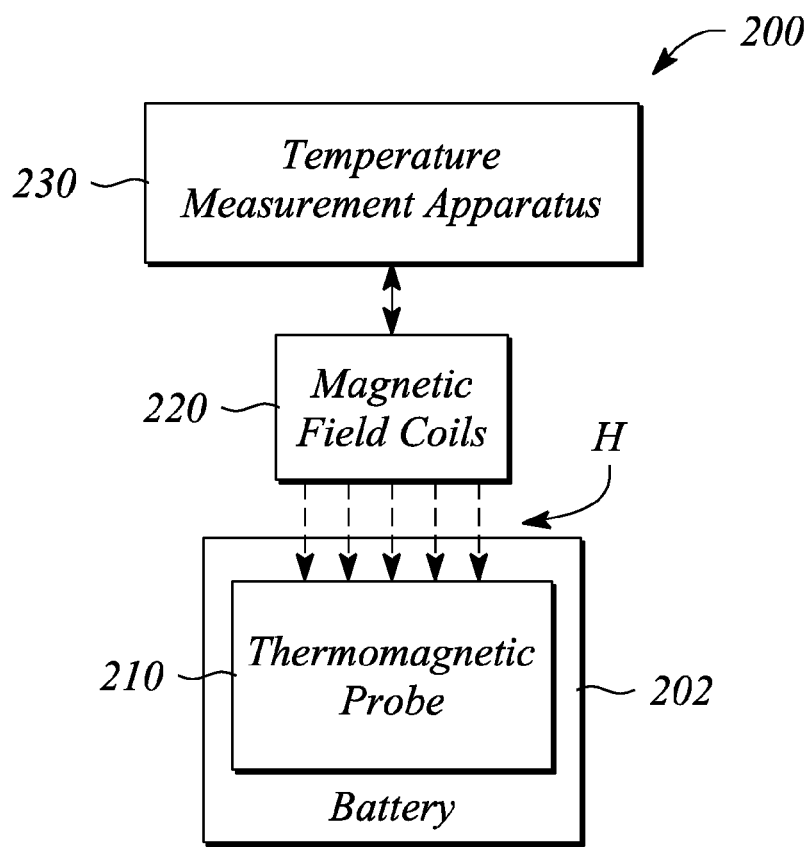
FIG. 6 illustrates a block diagram of a battery-temperature measurement system, according to an embodiment consistent with the principles of the present invention.

FIG. 6 illustrates a block diagram of a battery-temperature measurement system 200, according to an embodiment consistent with the principles of the present invention. The battery-temperature measurement system 200 is configured to measure an internal temperature of a battery 202. According to various embodiments, the battery-temperature measurement system 200 is not limited to a particular battery type or battery configuration.

For example, the battery 202 may have a cylindrical, a prismatic, or another configuration. Further, the battery 202 may employ virtually any battery technology (e.g., either rechargeable or non-rechargeable) including, but not limited to, nickel-cadmium (NiCd) technology, nickel-metal hydride (NiMH) technology, alkaline technology, and various types of lithium-ion technologies. The internal temperature of the battery 202 may be measured by the battery-temperature measurement system 200 remotely, according to some embodiments. In some embodiments, the measured internal temperature provides a thermal image of temperature within the battery 202. Note that, while referred to as a 'battery', the battery may comprise a plurality of cells (e.g., a plurality of separate batteries). As such, the battery-temperature measurement system 200 may provide an internal temperature or a thermal image of a plurality of battery cells grouped together to form 'battery,' according to some embodiments.

As illustrated in FIG. 6, the battery-temperature measurement system 200 comprises a thermomagnetic probe 210 in the battery 202 (or other device, for example). For example, the thermomagnetic probe 210 may be located in a core of the battery 202 to measure an internal temperature of the battery 202. The thermomagnetic probe 210 may be incorporated in or be part of one or more of a current collector of the battery 202 (e.g., as a thin film coating on the current collector), a conducting agent in a cathode or anode of the battery 202, a separator (e.g., a surface of the separator) of the battery 202 and even an insert (e.g., as nanoparticles with or without an inert coating) within an electrolyte or another portion of the battery 202, for example. In other examples, the thermomagnetic probe 210 may be adjacent to but substantially outside of a cell of the battery 202 (e.g., when the battery 202 comprises a plurality of separate cells). According to various embodiments, the thermomagnetic probe 210 may be substantially similar to the thermomagnetic probe 120 described above with respect to the thermomagnetic sensor 100. In particular, the thermomagnetic probe 210 may comprise a ferromagnetic material having a temperature-dependent magnetic permeability characterized by a maximum magnetic permeability value (e.g., a Hopkinson peak) at a temperature below a Curie temperature. Further, the temperature-dependent magnetic permeability has a monotonically decreasing value as a function of temperature between the maximum value and the Curie temperature, according to various embodiments.

The battery-temperature measurement system 200 further comprises a plurality of magnetic field coils 220. The magnetic field coils 220 are located external to the battery 202 and are therefore spaced apart from the thermomagnetic probe 210. According to various embodiments, the magnetic field coils 220 are configured to apply an alternating magnetic field H to the thermomagnetic probe 210 and to provide a mutual inductance measurement between pairs of the magnetic field coils 220 of the plurality. According to some embodiments, the alternating magnetic field H may be substantially similar to the alternating magnetic field H described above with respect to the thermomagnetic sensor 100. In addition, the magnetic field coils 220 may be substantially similar to the coils 110 described above, for example. In some embodiments, the magnetic field coils 220 may be arranged around the battery 202 in a ring, for example.

According to various embodiments, the battery-temperature measurement system 200 further comprises a temperature measurement apparatus 230. The temperature measurement apparatus 230 is configured to determine a temperature of the battery 202 according to a predetermined relationship between the temperature-dependent magnetic permeability of the ferromagnetic material of the thermomagnetic probe 210 and temperature. The temperature is determined using a mutual inductance measurement between selected ones of the magnetic field coils 220 of the plurality to measure the temperature-dependent magnetic permeability, according to various embodiments. In some embodiments, the temperature measurement apparatus 230 comprises an inductance meter configured to measure the mutual inductance of the selected pairs of the magnetic field coils 220. In other embodiments, the temperature measurement apparatus 230 may comprise another measurement apparatus including, but not limited to, a coupling measurement apparatus configured to measure a coupling between the pairs of magnetic field coils 220. The coupling measurement is then used to determine the temperature-dependent magnetic permeability. In some embodiments, the temperature measurement apparatus 230 determines a derivative of the temperature-dependent magnetic permeability instead of or in addition to the temperature-dependent magnetic permeability itself using the mutual inductance measurement. The derivative may be a derivative with respect to temperature (e.g., a slope of a change in the temperature-dependent magnetic permeability), for example.

In some embodiments, the temperature measurement apparatus 230 is configured to solve equation (1) for an N-dimensional vector [p] that represents the magnetic response or temperature-dependent magnetic permeability of each of N thermomagnetic probes 210, $$\begin{bmatrix} T_1 \\ \vdots \\ T_M \end{bmatrix} = \begin{bmatrix} S_{1,1} & \cdots & S_{1,N} \\ \vdots & \ddots & \vdots \\ S_{M,1} & \cdots & S_{M,N} \end{bmatrix} \begin{bmatrix} p_1 \\ \vdots \\ p_N \end{bmatrix} \quad (1)$$

where an M-dimensional vector [T] represents measurements (e.g., mutual inductance measurements) between M different pairs of the magnetic field coils 220, a matrix [S] having N columns and M rows represents a position-dependent sensitivity of the N thermomagnetic probes 210 with respect to the M measurements, and M, N are integers with M≥N. When equation (1) is solved, each of the N values of p (i.e., $p_1 \ldots, p_N$) corresponds to a temperature-dependent magnetic permeability of a different thermomagnetic probe 210, where each of the different thermomagnetic probes 210 is located at a different predetermined location (e.g., within the battery 202). The different locations may correspond to different x-y grid locations (e.g., different x,y coordinates within a Cartesian coordinate system) in a plane of or through the battery 202, for example. For example, the thermomagnetic probes 210 at different x-y grid locations may be represented by the sub-probes 122, 124, 126 of the thermomagnetic probe 120 illustrated in FIG. 4. Temperature of the thermomagnetic probes 210 at the different x-y grid locations may be determined from the temperature-dependent magnetic permeability values p using a look-up table or curve (e.g., such as is illustrated in FIG. 1) that relates the temperature-dependent magnetic permeability to temperature, according to various examples.

In some embodiments, values of the position-dependent sensitivity matrix [S] are obtained by placing a thermomagnetic probe 210 at each of the different predetermined locations (i.e., x,y grid locations) within the battery 202 and determining the temperature-dependent magnetic permeability (i.e., p) for each pair of magnetic field coils 220 at a known or baseline temperature using the mutual inductance measurement. For example, if the thermomagnetic probe 210 is located at a predetermined location, hypothetically #25, and assuming that there are a total of fifty-six possible different combinations of magnetic field coils pairs, the measurement of mutual inductance will yield values for $S_{1,25}$ and $S_{56,25}$ of the position-dependent sensitivity matrix [S]. Repeating the process for each different position will provide all of the values of the position-dependent sensitivity matrix [S].

Figure 7:
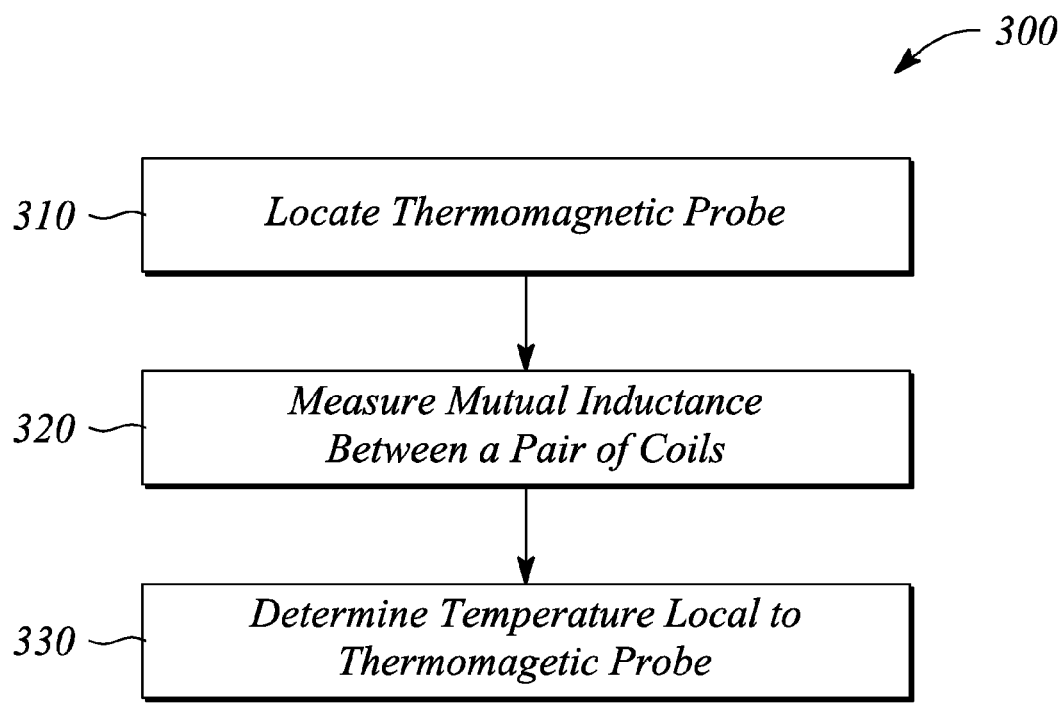
FIG. 7 illustrates a flow chart of a method of measuring temperature using a thermomagnetic effect, according to an embodiment consistent with the principles of the present invention.

FIG. 7 illustrates a flow chart of a method 300 of measuring temperature using a thermomagnetic effect, according to an embodiment consistent with the principles of the present invention. In particular, the method 300 of measuring temperature employs a temperature-dependent magnetic permeability to remotely measure temperature, according to various embodiments. The temperature-dependent magnetic permeability may be provided by a ferromagnetic material of a thermomagnetic probe, for example. The remotely measured temperature is measured without physical contact with the thermomagnetic probe and represents a temperature local to the thermomagnetic probe, according to various embodiments.

The method 300 of measuring temperature comprises locating 310 the thermomagnetic probe adjacent to a plurality of coils. The thermomagnetic probe comprises a ferromagnetic material having a temperature-dependent magnetic permeability characterized by a maximum value (e.g., at the Hopkinson peak) at a temperature below a Curie temperature of the ferromagnetic material, according to various embodiments. Further, the temperature-dependent magnetic permeability of the ferromagnetic material monotonically decreases as a function of temperature between the temperature corresponding to the maximum magnetic permeability value and the Curie temperature. In some embodiments, the thermomagnetic probe is substantially similar to the thermomagnetic probe 120 described above with respect to the thermomagnetic sensor 100.

The method 300 of measuring temperature further comprises measuring 320 a mutual inductance between a pair of coils of the plurality. The measurement 320 of mutual inductance is configured to determine the temperature-dependent magnetic permeability of the thermomagnetic probe. The mutual inductance may be measured 320 using an inductance meter (e.g., an LCZ meter) and an alternating magnetic field H, for example. In some examples, the alternating magnetic field H has a frequency of less than about 10 kHz and greater than about 10 Hz.

In some embodiments, the plurality of coils is arranged in a ring to surround (and for example, enclose) the thermomagnetic probe. An angular spacing between the coils around the ring may be substantially equiangular, for example. Measuring 320 the mutual inductance between a pair of coils includes measuring one or more selected pairs of coils around the ring, according to some embodiments. According to some embodiments (not illustrated), the method 300 may further comprise moving the thermomagnetic probe relative to the coils of the plurality. In these embodiments, measuring 320 the mutual inductance between a pair of coils may be performed at a predetermined relative distance between the thermomagnetic probe and the pair of coils. For example, the thermomagnetic probe may be mounted on a rotating member (e.g., a rotating disk or wheel) that is configured to rotate between the pair of coils (e.g., see FIG. 5B).

The method 300 of measuring temperature further comprises determining 330 a temperature local to the thermomagnetic probe from the measured mutual inductance. The temperature is determined 330 according to a predetermined relationship between the temperature-dependent magnetic permeability of the ferromagnetic material of the thermomagnetic probe and temperature. In particular, the local temperature is determined 330 according to the predetermined relationship in a temperature range between the temperature corresponding to the maximum value of the temperature-dependent magnetic permeability (i.e., Hopkinson peak) and the Curie temperature of the ferromagnetic material of the thermomagnetic probe, according to various embodiments. The predetermined relationship may be established by calibration of the thermomagnetic probe. For example, calibration may provide a either look-up table or a curve (e.g., as illustrated in FIG. 1) that relates either the temperature-dependent magnetic permeability or equivalently the measured mutual inductance and the temperature of the thermomagnetic probe.

In some embodiments, the located 310 thermomagnetic probe may comprise nickel and may be realized or configured as one or more of a rod, a wire, a particle (e.g., a nanoparticle) and a film (e.g., a thin film). In some embodiments, the located 310 thermomagnetic probe may comprise a plurality of separate, spaced-apart sub-probes, each sub-probe producing a temperature-dependent magnetic permeability associated with a local temperature in a vicinity of the sub-probe. In some embodiments, a plurality of different measurements of the temperature-dependent magnetic permeability of the sub-probes in combination provides a multi-dimensional thermal image of the local temperature (e.g., using equation (1)).

Thus, there have been described examples of a thermomagnetic sensor, a battery-temperature measurement system and a method of measuring temperature remotely that employ a thermomagnetic effect of a ferromagnetic material and a plurality of coils. It should be understood that the above-described examples are merely illustrative of some of the many specific examples that represent principles consistent with the principles described herein. Clearly, those skilled in the art can readily devise numerous other arrangements without departing from the scope consistent with the principles described herein as defined by the following claims.

What is claimed is:

1. A thermomagnetic sensor comprising:
   a plurality of coils spaced apart from one another and configured to provide a mutual inductance measurement between a selected pair of the coils of the plurality; and
   a thermomagnetic probe structurally configured inside a device in which an internal temperature of the device is to be remotely measured, the plurality of coils being arranged external to the device and physically spaced apart from the thermomagnetic probe such that the thermomagnetic probe is spatially located between the selected pair of coils, the thermomagnetic probe comprising a ferromagnetic material having a temperature-dependent magnetic permeability characterized by a maximum value at a temperature below a Curie temperature of the ferromagnetic material, the temperature-dependent magnetic permeability monotonically decreasing as a function of temperature between a temperature corresponding to the maximum value and the Curie temperature,
   wherein the mutual inductance measurement is configured to provide a remote measurement of the internal temperature of the device local to the thermomagnetic probe according to a predetermined relationship between the temperature-dependent magnetic permeability and temperature.

2. The thermomagnetic sensor of claim 1, wherein the mutual inductance measurement employs an alternating magnetic field having a frequency between about 10 hertz and about 10 kilohertz.

3. The thermomagnetic sensor of claim 1, wherein the plurality of coils is spatially arranged to externally surround the device such that the thermomagnetic probe is between the selected pair of coils of the plurality of coils without direct contact to the selected pair of coils.

4. The thermomagnetic sensor of claim 1, wherein the plurality of coils is spatially arranged in a ring around the device to externally surround the thermomagnetic probe, an angular spacing between the coils around the ring being substantially equiangular.

5. The thermomagnetic sensor of claim 1, wherein the coils of the selected pair are stationary, one or both of the device and the thermomagnetic probe inside the device being configured to be mobile with respect to the stationary coils.

6. The thermomagnetic sensor of claim 5, further comprising a rotating member, the thermomagnetic probe being located on the rotating member, the stationary coils of the selected pair being arranged such that the thermomagnetic probe rotates between the stationary coils.

7. The thermomagnetic sensor of claim 1, wherein the ferromagnetic material of the thermomagnetic probe comprises nickel.

8. The thermomagnetic sensor of claim 1, wherein the thermomagnetic probe comprises the ferromagnetic material formed into one or more of a thin film, a plurality of particles, a spheroid, a wire and a rod.

9. The thermomagnetic sensor of claim 1, wherein the thermomagnetic probe comprises a plurality of separate, spaced-apart sub-probes arranged inside the device, each sub-probe exhibiting a temperature-dependent magnetic permeability associated with a local temperature in a vicinity of the sub-probe,
   wherein the plurality of coils is spatially arranged to externally surround the device such that each sub-probe is between a selected pair of coils of the plurality of coils, and
   wherein mutual inductance measurements between different selected pairs of coils and sub-probes are configured to provide local temperatures in the vicinities of the sub-probes, a combination of the local temperatures being a multi-dimensional thermal image of the internal temperature of the device.

10. A battery-temperature measurement system comprising the thermomagnetic sensor of claim 1, wherein the thermomagnetic probe is located inside a battery, the measurement of local temperature providing a remote measurement of an internal temperature of the battery.

11. The battery-temperature measurement system of claim 10, wherein the thermomagnetic probe inside the battery is one or more of located in a current collector, a conducting agent, and a separator of the battery.

12. A battery-temperature measurement system comprising:
   a thermomagnetic probe in a battery, the thermomagnetic probe comprising a ferromagnetic material having a temperature-dependent magnetic permeability that decreases monotonically as a function of temperature between a maximum value at a temperature below a Curie temperature of the ferromagnetic material and the Curie temperature;
   a plurality of magnetic field coils external to the battery; and
   a temperature measurement apparatus to determine a temperature of the battery according to a predetermined relationship between the temperature-dependent magnetic permeability and temperature using a mutual inductance measurement between selected magnetic field coils of the plurality to measure the temperature-dependent magnetic permeability,
   wherein the determined temperature is between a temperature corresponding to the maximum value and the Curie temperature.

13. The battery-temperature measurement system of claim 12, wherein the temperature measurement apparatus comprises an inductance meter to measure the mutual inductance of the selected magnetic field coils to determine the temperature-dependent magnetic permeability.

14. The battery-temperature measurement system of claim 12, wherein the thermomagnetic probe comprises a plurality of separate, spaced-apart sub-probes, each sub-probe producing a temperature-dependent magnetic permeability associated with a local temperature in a vicinity of the sub-probe, and wherein a plurality of different measurements of the temperature-dependent magnetic permeability of the sub-probes in combination provides a multi-dimensional thermal image of the local temperature.

15. The battery-temperature measurement system of claim 12, wherein the ferromagnetic material of the thermomagnetic probe comprises nickel, and wherein an alternating magnetic field of the temperature measurement apparatus has a frequency less than about 10 kilohertz.

16. A method of measuring temperature using a thermomagnetic effect, the method comprising:
locating a thermomagnetic probe and a plurality of coils with respect to a device in which an internal temperature of the device is to be remotely measured, the plurality of coils being spaced apart from one another external to the device and configured to provide a mutual inductance measurement between a pair of the coils of the plurality, the thermomagnetic probe being internal to the device physically spaced apart from and adjacent to the plurality of coils, the thermomagnetic probe comprising a ferromagnetic material having a temperature-dependent magnetic permeability characterized by a maximum value at a temperature below a Curie temperature of the ferromagnetic material, the temperature-dependent magnetic permeability monotonically decreasing between the temperature corresponding to the maximum value and the Curie temperature;
measuring a mutual inductance between a pair of the coils of the plurality to remotely determine the temperature-dependent magnetic permeability of the ferromagnetic material of the thermomagnetic probe; and
determining a temperature local to the thermomagnetic probe according to a predetermined relationship between the remotely determined temperature-dependent magnetic permeability and temperature, the determined local temperature being the local internal temperature of the device,
wherein the local internal temperature of the device is determined in a temperature range between the temperature corresponding to the maximum value and the Curie temperature.

17. The method of measuring temperature of claim 16, wherein the plurality of coils is arranged in a ring to externally surround the device such that the thermomagnetic probe is spatially between a selected pair of coils of the plurality of coils without direct contact to the selected pair of coils, an angular spacing between the coils around the ring being substantially equiangular.

18. The method of measuring temperature of claim 16, further comprising moving the thermomagnetic probe relative to the coils of the plurality, wherein the mutual inductance is measured at a predetermined relative distance between the thermomagnetic probe and the pair of coils.

19. The method of measuring temperature of claim 16, wherein the thermomagnetic probe is located one of inside a battery or adjacent to a battery, the determined temperature being a temperature of the battery.

20. The method of measuring temperature of claim 16, wherein the thermomagnetic probe comprises a plurality of sub-probes spaced apart from one another, the method further comprising arranging the plurality of sub-probes at different locations inside the device,
wherein measuring a mutual inductance comprises measuring the mutual inductances between different combinations of the selected pairs of coils and the sub-probes at the different locations in the device, and
wherein determining a local temperature comprises using the mutual inductance measurements between the different combinations to map the internal temperatures at the different locations in the device, and providing a multi-dimensional thermal image of a temperature profile within the device from the map of internal temperatures at the different locations.

* * * * *